US008260355B2

(12) United States Patent
Kamada et al.

(10) Patent No.: US 8,260,355 B2
(45) Date of Patent: Sep. 4, 2012

(54) PORTABLE COMMUNICATION TERMINAL, PROGRAM EXECUTED BY PORTABLE COMMUNICATION TERMINAL

(75) Inventors: Tomihisa Kamada, Tokyo (JP);
Hiroyuki Suzuki, Yokohama (JP);
Fumio Kawabata, Saitama (JP)

(73) Assignee: Access Co., Ltd., Tokyo (JP)

( * ) Notice: Subject to any disclaimer, the term of this patent is extended or adjusted under 35 U.S.C. 154(b) by 350 days.

(21) Appl. No.: 12/593,895

(22) PCT Filed: Mar. 10, 2008

(86) PCT No.: PCT/JP2008/000521
§ 371 (c)(1),
(2), (4) Date: Sep. 29, 2009

(87) PCT Pub. No.: WO2008/129773
PCT Pub. Date: Oct. 30, 2008

(65) Prior Publication Data
US 2010/0130254 A1    May 27, 2010

(30) Foreign Application Priority Data

Mar. 30, 2007  (JP) ................. 2007-092405

(51) Int. Cl.
*H04B 1/38* (2006.01)
*H04M 3/00* (2006.01)
*H04M 1/675* (2006.01)

(52) U.S. Cl. .................. 455/558; 455/418; 455/411
(58) Field of Classification Search .............. 455/411, 455/418, 558
See application file for complete search history.

(56) References Cited

U.S. PATENT DOCUMENTS

| 2002/0188736 | A1* | 12/2002 | Jarvensivu | 709/229 |
| 2003/0135748 | A1* | 7/2003 | Yamada et al. | 713/193 |
| 2005/0184163 | A1* | 8/2005 | de Jong | 235/492 |
| 2005/0239504 | A1* | 10/2005 | Ishii et al. | 455/558 |
| 2007/0004454 | A1* | 1/2007 | Schweiger et al. | 455/558 |

(Continued)

FOREIGN PATENT DOCUMENTS

CN    1430140 A    7/2003

(Continued)

OTHER PUBLICATIONS

International Preliminary Report on Patentability mailed Oct. 15, 2009, for PCT Application No. PCT/JP2008/000521 filed Mar. 10, 2008, 5 pages (English translation attached, 5 pages).

(Continued)

*Primary Examiner* — Jean Gelin
*Assistant Examiner* — Michael Mapa
(74) *Attorney, Agent, or Firm* — Morrison & Foerster LLP

(57) ABSTRACT

In a portable communication terminal that functions as a communication instrument by installing an identification recording medium having subscriber information recorded therein, an application acquiring unit 104 is operative to transmit a contract number recorded in the identification recording medium to the server when the identification recording medium is installed for the first time, and downloads an application program linked to the contract number from the server. A checking unit 108 is operative to check identification information embedded in the application program against identification information embedded in the identification recording medium. A function restricting unit 110 is operative to restrict the use of at least a part of the functions of the application program when the identification information of the application program does not match the identification information of the identification recording medium.

24 Claims, 9 Drawing Sheets

U.S. PATENT DOCUMENTS

| | | | |
|---|---|---|---|
| 2007/0015538 A1* | 1/2007 | Wang | 455/558 |
| 2008/0220743 A1* | 9/2008 | Mora et al. | 455/411 |
| 2010/0071037 A1 | 3/2010 | Yamada et al. | |

FOREIGN PATENT DOCUMENTS

| | | | |
|---|---|---|---|
| JP | 2002-300254 A | 10/2002 | |
| JP | 2003-186677 A | 7/2003 | |
| JP | 2003-198718 A | 7/2003 | |
| JP | 2004-153461 A | 5/2004 | |
| JP | 2004-215250 A | 7/2004 | |
| JP | 2004-312290 A | 11/2004 | |
| WO | WO-2005-086519 A1 | 9/2005 | |

OTHER PUBLICATIONS

International Search Report mailed May 1, 2008, for PCT Application No. PCT/JP2008/000521 filed Mar. 10, 2008, 2 pages (English translation attached, 2 pages).

Office Action received for Chinese Patent Application No. 200880008920.0, issued on Jan. 6, 2012, 21 pages (13 page of English translation and 8 pages of Office Action).

* cited by examiner

PORTABLE COMMUNICATION TERMINAL, PROGRAM EXECUTED BY PORTABLE COMMUNICATION TERMINAL

TECHNICAL FIELD

The present invention relates to a portable communication terminal that functions as a communication instrument by installing an identification recording medium having subscriber information recorded therein.

BACKGROUND ART

Portable communication terminals such as cell phones available recently have a number of default applications installed in the terminal. Today, users of portable communication terminals can download a variety of application programs (e.g., word processor, spreadsheet, viewer, game, music, electronic money, and schedule) from a server and use the program. Patent document No. 1 discloses such a technology, whereby membership service is provided only to portable communication terminals having a program installed therein legitimately.
[patent document No. 1] JP 2004-312290

DISCLOSURE OF THE INVENTION

Problem to be Solved by the Invention

Third-generation cell phones are equipped with a subscriber identity module (SIM) card having information such as telephone numbers written therein as a standard feature. The same telephone number can be used in a plurality of terminals by using a SIM card in different terminals by replacement, or a plurality of persons can share a terminal by allowing a plurality of SIM cards to be used in a single terminal by replacement. However, a lot of terminals are "SIM-locked", i.e., are configured to prohibit the replacement of the SIM card, from the perspective allowing carriers to share the market.

When a portable communication terminal is SIM-locked, the terminal has to be exchanged each time the user makes a contract with a new carrier, forcing the user to experience inconvenience. When a portable communication terminal is not SIM-locked, however, there is a problem in that the application program downloaded from a server of a given carrier continues to be used while a SIM card for a carrier other than the original carrier is being installed.

As a result, the carrier will fail to recover the cost required to develop or provide the application program and be discouraged to provide unique services.

The present invention addresses the problem and a purpose thereof is to provide a portable communication terminal capable of being shared between carriers and still protecting carrier-specific application programs or services.

Means to Solve the Problem

One embodiment of the present invention relates to a portable communication terminal that functions as a communication instrument by installing an identification recording medium having subscriber information recorded therein. The terminal comprises: an interface unit operative to communicate with an identification recording medium installed; an application acquiring unit operative to connect to a server designated by the identification recording medium, when the identification recording medium is installed for the first time, and to download an application program linked to the identification recording medium; a checking unit operative to check identification information embedded in the application program against identification information embedded in the identification recording medium; and a function restricting unit operative to restrict the use of at least a part of the functions of the application program when the identification information of the application program does not match the identification information of the identification recording medium.

According to the embodiment, when an identification recording medium is installed for the first time, an application program (hereinafter, simply referred to as application) linked to the medium is downloaded from a server. Thus, when an identification recording medium for a different carrier is installed to replace the previously installed medium, the application specific to the different carrier is immediately made available in place of the original application. Only when the identification information in the identification recording medium matches the identification information in the application, the functions of the application are fully made available. Accordingly, even when an identification recording medium for a different carrier is installed to replace the previously installed medium, the additional application specific to the carrier and the services using the same can be protected. The phrase "installed for the first time" encompasses a case where the identification recording medium is installed in the portable communication terminal for the first time and a case where another identification recording medium is removed and a new identification recording medium is installed. The modes of "restricting the use of at least a part of the functions of the additional application" include disabling the operation of the application itself, transforming the data necessary for the application to achieve its function, and transforming the structure necessary, in an indirect way, for the application to achieve its function.

The application acquiring unit may transmit to the server the identification information embedded in the identification recording medium and terminal information indicating a feature of the portable communication terminal and stored in a predetermined storage area of the portable communication terminal, and receive the application program linked to the terminal information from the server. In this way, applications specific to different types of portable communication terminals can be downloaded. The term "terminal information" encompasses the fixed ID of the terminal and the version information of the terminal.

When the identification information of the application program already installed in the portable communication terminal and the identification information of the identification recording medium do not match, the function restricting unit may prevent the application program from being started. In this way, when a new identification recording medium is installed for replacement, the application linked to the previously installed identification recording medium can be disabled for use.

The terminal may further comprise a communication enabling unit operative to enable communication with the server only while the identification recording medium is being installed.

The checking unit may be implemented as a function of the operating system of the portable communication terminal and check the identification information of the application program against the identification information of the identification recording medium before the application program is started. The checking unit may be implemented as a function of each application installed in the portable communication terminal and check the identification information of the application program against the identification information of the identification recording medium after the application program is started. The checking unit may be implemented as a function of the identification recording medium installed in the portable communication terminal and check the identification information of the application program against the identification information of the identification recording medium before the application program is started.

The terminal may further comprise an application deleting unit operative to delete the application program linked to the identification recording medium when the identification recording medium is detached from the portable communication terminal. This allows the applications linked to the previously installed identification recording medium to be collectively deleted when the new identification recording medium is installed for replacement.

The terminal may further comprise a data saving unit operative to save data created by the application program linked to the identification recording medium that is detached from the portable communication terminal. This allows reuse of the data created while the previously installed identification recording medium was in use.

The data saving unit may save the data in the identification recording medium that is detached. This allows the data created while the previously installed identification recording medium was in use to be disabled for use while the new identification recording medium is being installed.

The data saving unit may save the data in the server. In this case, the data stored in the server may be made available for use or disabled for use when the new identification recording medium is installed.

The data saving unit may save the data in a storage area of the portable communication terminal. This allows the data created while the previously installed identification recording medium was in use to be referred to even when the new identification recording medium is installed, provided that the data format is shared. Accordingly, the data can be shared by a plurality of identification recording mediums.

One embodiment of the present invention relates to a computer program embedded in a computer readable recording medium and adapted for a portable communication terminal that functions as a communication instrument by installing an identification recording medium having subscriber information recorded therein. The program comprises: a module operative to allow the terminal to connect to a server designated by the identification recording medium, when the identification recording medium is installed in the portable communication terminal for the first time, a module operative to allow the terminal to download an application program linked to the identification recording medium; a module operative to allow the terminal to check identification information embedded in the application program against identification information embedded in the identification recording medium; and a module operative to allow the terminal to restrict the use of at least a part of the functions of the application program when the identification information of the application program does not match the identification information of the identification recording medium.

Optional combinations of the aforementioned constituting elements, and implementations of the invention in the form of methods, apparatuses, systems, recording mediums and computer programs may also be practiced as additional modes of the present invention.

Advantage of the Present Invention

According to the present invention, a portable communication terminal, which functions as a communication instrument by installing an identification recording medium, can be used for different carriers and the application or services specific to the carrier can be protected at the same time.

DESCRIPTION OF THE REFERENCE NUMERALS

10 portable communication terminal, 12 server, 14 network, 48 SIM card holder, 50 SIM card, 60 operating system, 62 application space, 70 basic application, 80 additional application, 90 application management server, 102 SIM interface unit, 104 application acquiring unit, 106 communication enabling unit, 108 checking unit, 110 function restricting unit, 112 application deleting unit, 114 data saving unit

BEST MODE FOR CARRYING OUT THE INVENTION

One embodiment of the present invention relates to a portable communication terminal provided with the function of downloading from a server an application program linked to an SIM card installed in the terminal, in addition to an operating system and the basic function (e.g., the phone call function, communication function, and software downloading function).

In the related-art portable communication terminal, no distinction is made between the program that provides the basic function and the application providing an additional function specific to a carrier. Allowing the user to replace a SIM card by a card for another carrier results in the application specific to the original carrier being also used when the SIM card for the new carrier is installed. In contrast, the portable communication terminal according to the embodiment is configured such that the terminal itself can continue to be used regardless of the carrier but the application specific to the carrier is acquired from a predetermined server subsequent to the installation.

The embodiment provides a portable communication terminal with a SIM lock function implemented on an application-by-application basis to disable the use of the application specific to the original carrier when a SIM card for a different carrier is installed to replace the previously installed card.

A general description of a portable communication terminal will be given below, followed by a detailed description of SIM lock according to the embodiment implemented on an application-by-application basis.

Figure 1:
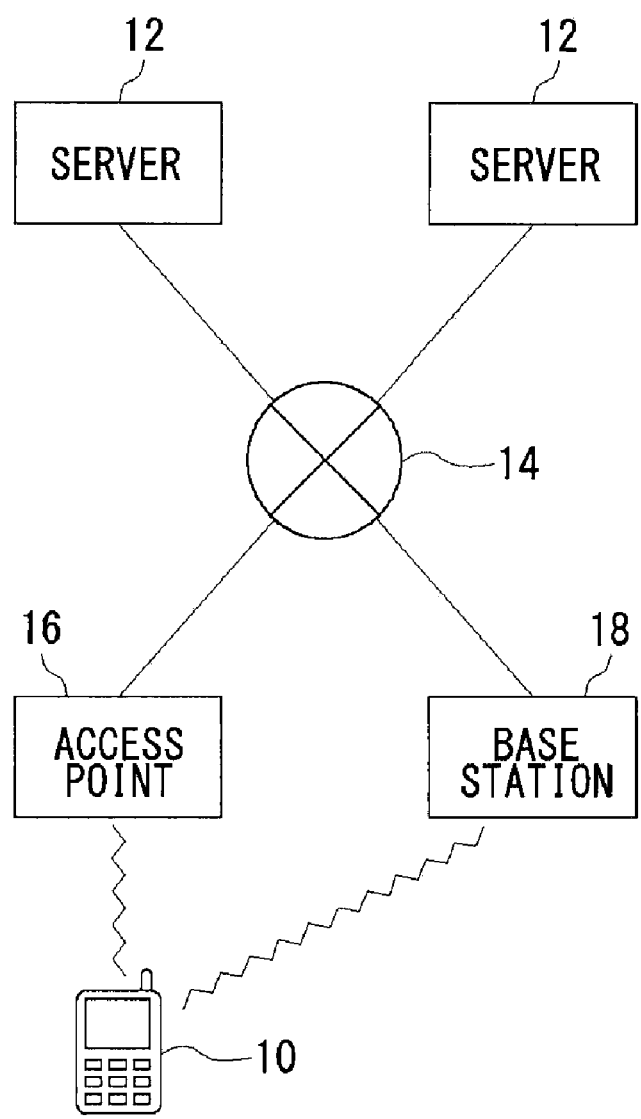
FIG. 1 shows the entire configuration of a network system including a portable communication terminal according to the embodiment.

FIG. 1 shows the entire configuration of a network system including a portable communication terminal 10 according to the embodiment.

The portable communication terminal 10 may be any hardware movable with the user, such as a laptop PC (personal computer), PDA, cellular phone, and car navigation device provided with communication functions. The portable communication terminal 10 is connected by the user's operation to a network 14, such as a local area network (LAN) and the Internet, via an access point 16 or a base station 18, and is capable of accessing a server 12 specified by a uniform resource locator (URL) and of acquiring desired data.

The server 12 provides the portable communication terminal 10 with data such as text data, image data, audio data, video data, etc. via the network 14. The server may be a service entity on the Internet such as a web server. In that case, the invention may be implemented in various modes including: a mode embodied, for example, by a Common Gateway Interface (CGI) in which the server side takes care of the major processing functions; a mode embodied by, for example, a Java (registered trademark) applet in which the major processing functions are shifted to the client side; and a mode in which a Java (registered trademark), major processing functions, is provided in both the server side and the client side.

The portable communication terminal 10 is configured so that it can refer to and edit a file stored in an internal storage or a storage medium by the user's operation, even if the device does not access the network 14.

Figure 2:
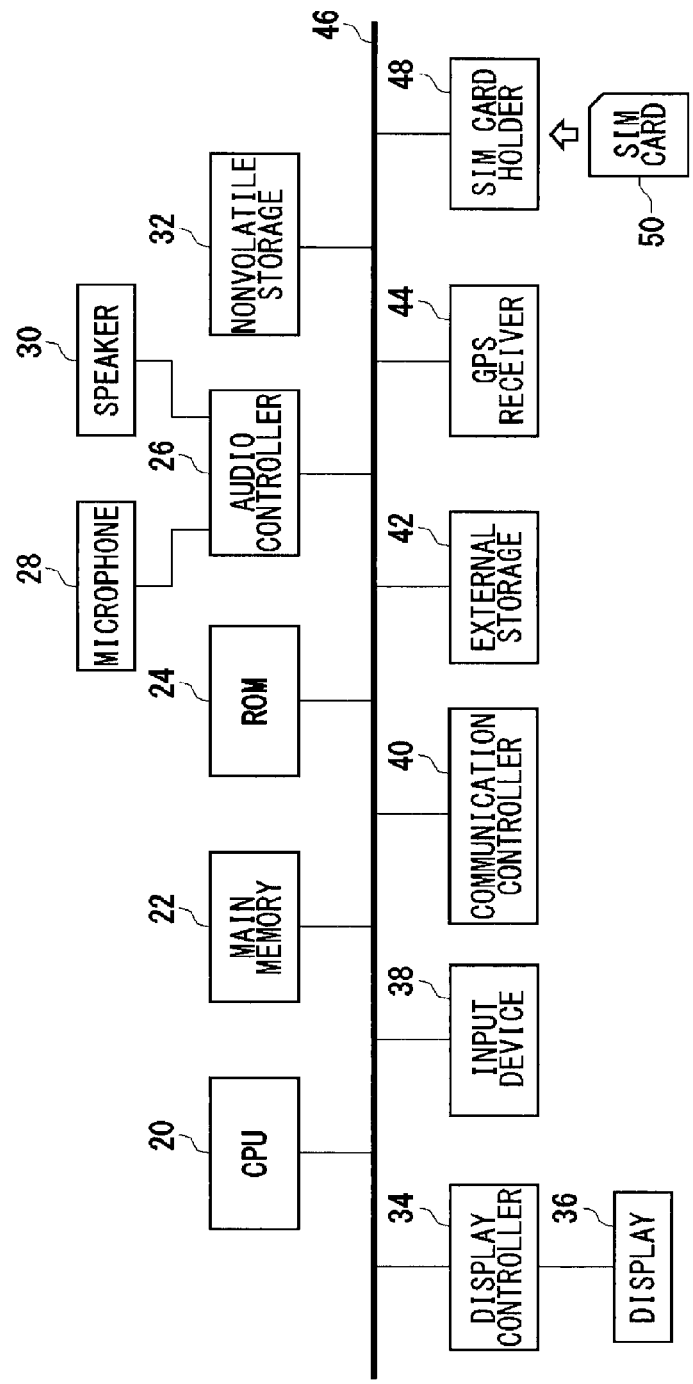
FIG. 2 shows the hardware configuration of the portable communication terminal.

FIG. 2 shows the hardware configuration of the portable communication terminal 10. The portable communication terminal 10 is provided with a central processing unit (CPU) 20, a main memory (RAM: random access memory) 22, a read only memory (ROM) 24, an audio controller 26, a nonvolatile storage 32, a display controller 34, an input device 38, a communication controller 40, an external storage 42, a GPS receiver 44, and an SIM card holder 48. These are mutually connected via a bus 46.

The CPU 20 runs an operating system and controls the entire portable communication terminal 10. The CPU 20 also reads into the main memory 22 a program or data from the ROM 24 or the recording medium loaded into the external storage 42, and performs various kinds of processing accordingly. The main memory 22 serves as a temporary storage and a work area which is needed when the CPU 20 executes the program, and as an area which stores various kinds of data required for program execution. The ROM 24 is a read-only storage which stores a computer program and data processed by the CPU 20.

The audio controller 26 is provided in the portable communication terminal such as a cellular phone provided with a telephone function and is connected with a microphone 28 and a loudspeaker 30 for audio input output control.

The nonvolatile storage 32 is a storage capable of retaining the memory content even after power OFF, and may be a hard disk drive or a semiconductor memory such as a flash memory.

The display controller 34 generate a video signal for displaying the data drawn by the CPU in a frame buffer (not shown) on a display 36 provided in the portable communication terminal 10.

The input device 38 is a device for the user to provide directions for operation to the portable communication terminal 10. The input device 38 may be any device suited to the device. For example, the input device may be: keys; a pointing device like a trackpad; buttons; and a touch panel provided on the surface of the display 36. A mouse may be connected to the portable communication terminal via, for example, a universal serial bus (USB) terminal.

The communication controller 40 controls communication of sound and data by various communication schemes. The data communication scheme may be wireless LAN such as IEEE802.1b/g, infrared communication, or data communication such as packet communication. The portable communication terminal 10 may be connected to the network 14 using a cable.

The external storage 42 is a drive device that uses a removable recording medium. The recording medium may be a magnetic disk, an optical disk, a magneto-optical disc, or a semiconductor memory.

The GPS (global positioning system) module 44 is a device for determining the location of a portable communication terminal based on a signal from an artificial satellite and includes an antenna for receiving a GPS signal, a receiver, and a device for converting the received signal into latitude and longitude.

The SIM card holder 48 is for accommodating an SIM card 50.

All of the constituting elements are well known so that a detailed description will be omitted.

Figure 3:
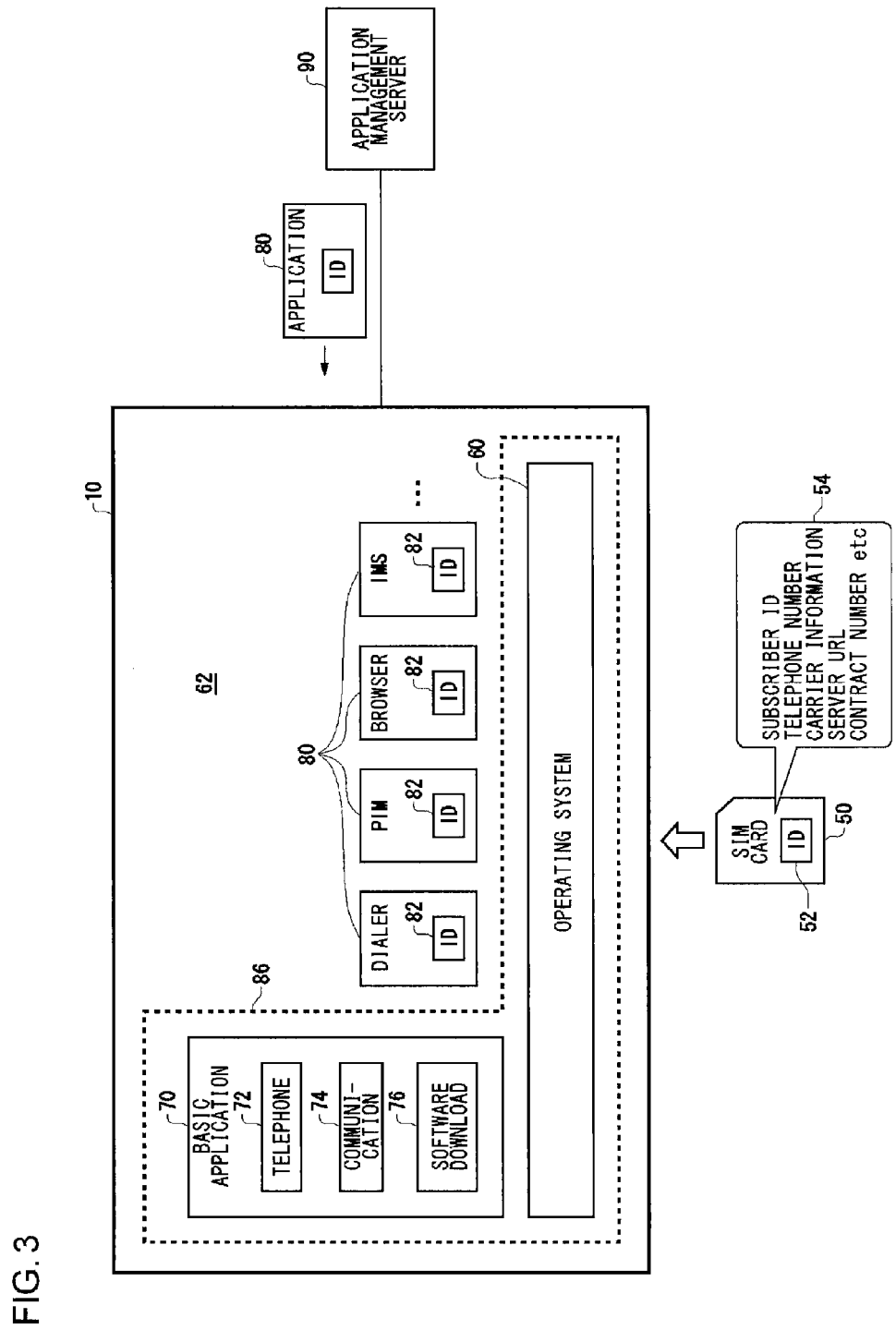
FIG. 3 is a schematic diagram showing the relation between the operating system and the application in the portable communication terminal.

FIG. 3 is a schematic diagram showing the relation between the operating system (hereinafter, simply referred to as "OS") in the portable communication terminal 10 and the application.

An operating system 60 and basic applications 70 are preinstalled in the portable communication terminal 10 according to the embodiment. The operating system 60 has various functions, such as process control, memory management, device management, GUI, and application software monitoring. The basic applications 70 are minimum applications required for the portable communication terminal 10 to achieve its function.

FIG. 3 shows a phone call function application 72, a communication function application 74, and a software download application 76 as the basic applications 70. Preferably, the OS 60 and the basic applications 70 (enclosed by a broken line 86), which are preinstalled software, provide the SIM lock function according to the embodiment implemented on an application-by-application basis.

An application space 62 is prepared in the portable communication terminal 10. The user is capable of downloading and using an additional application other than the basic applications from an application management server 90 to the application space 62. The application management server 90 is prepared for each carrier. The IP address or the URL of the application management server 90 is recorded in the SIM card 50 installed in the portable communication terminal 10.

The SIM card 50 is a card provided with an IC card with a built-in CPU. The SIM card 50 records information 54 (e.g., identification information for each subscriber (hereinafter, referred to as subscriber ID), telephone number, information on the carrier, and contract number) that makes the portable communication terminal 10 function as a communication instrument. By attaching and detaching the SIM card 50, it is possible to transfer the telephone number to another terminal or switch between a plurality of telephone numbers in a single terminal.

The portable communication terminal 10 is provided with the function of downloading an additional application 80 from the application management server 90 when the SIM card is installed for the first time. When the portable communication terminal 10 is turned on after installing the SIM card 50, information 54 in the SIM card 50 is provided to the portable communication terminal 10. The additional application corresponding to the contract number is downloaded from the application management server 90. By way of example, the additional application 80 may be a dialer, personal information manager (PIM), browser, or an IP multimedia subsystem (IMS).

A subscriber ID 82 is encrypted and embedded in the additional application 80. The portable communication terminal 10 checks the subscriber ID 82 of the additional application 80 against the subscriber ID 52 of the SIM card 50. When the subscriber IDs do not match, the additional application is disabled for use or a part of the functions thereof is restricted.

By linking the SIM card 50 with the application specific to the carrier, the additional application 80 in the application space 62 is switched at the time of replacing the SIM card, allowing the portable communication terminal 10 to function as a terminal exclusively used for a given carrier. Since the additional application is prevented from being started or being restricted in use when the subscriber ID of the additional application and the subscriber ID in the SIM card do not match, it is possible to lock the application on an application-by-application basis.

Figure 4:
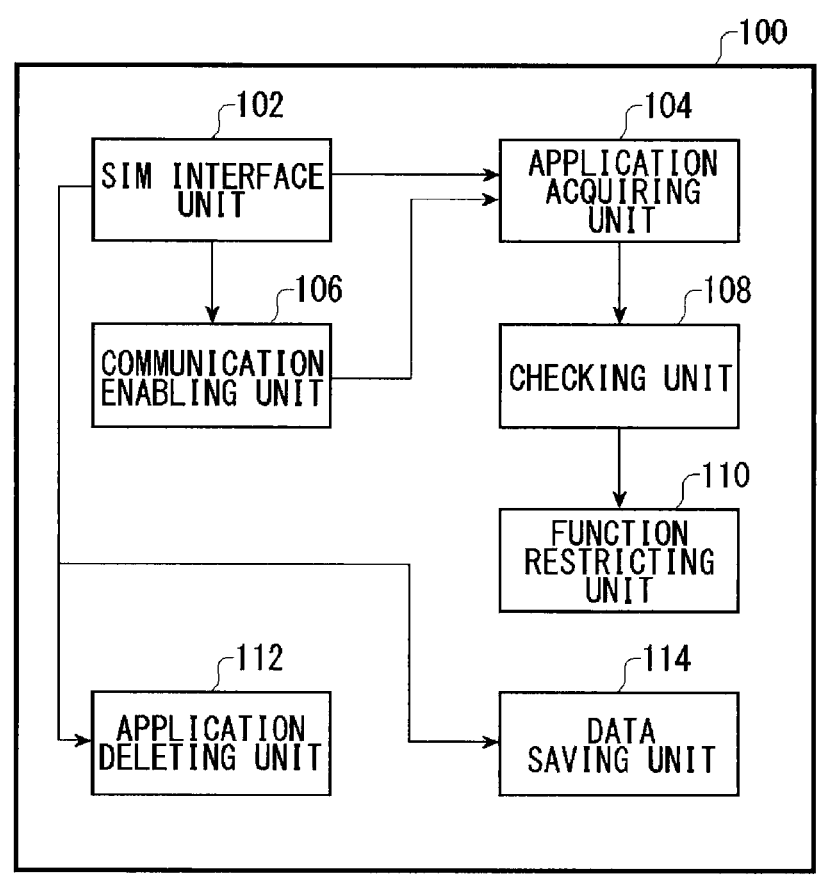
FIG. 4 is a block diagram of the portable communication terminal that implements SIM lock on an application-by-application basis.

FIG. 4 is a block diagram 100 of the portable communication terminal 10 that implements SIM lock on an application-by-application basis. The configuration is implemented, in hardware, by any CPU, a memory, or other LSIs or the SIM card 50 installed in the portable communication terminal 10 and, in software, by the preinstalled software 86 and the additional application 80 of the portable communication terminal 10. FIG. 4 depicts functional blocks implemented by the cooperation of hardware and software. Therefore, it will be obvious to those skilled in the art that the functional blocks may be implemented in a variety of manners by hardware only, software only, or a combination of thereof.

An SIM interface unit 102 functions as an interface for the SIM card accommodated in the SIM card holder 48.

An application acquiring unit 104 acquires the IP address or the URL of the application management server recorded in the SIM card, when the unit 104 is notified by the SIM interface unit 102 that the SIM card is installed in the portable communication terminal. The unit 104 connects to the application management server 90 via the communication function application 74. The unit 104 transmits the contract number recorded in the SIM card to the application management server 90. In response, the application management server 90 transmits the additional application linked to the contract number to the portable communication terminal. The application acquiring unit 104 downloads the application via the software download application 76.

A checking unit 108 checks the subscriber ID embedded in the downloaded application against the subscriber ID embedded in the SIM card. It is preferable that the subscriber ID is encrypted before being embedded in the application program and the SIM card. Other identification information may be used instead of the subscriber ID.

It is preferable that the checking unit 108 is primarily implemented as a function of the OS. By implementing the checking unit 108 as an OS function, the unit 108 is capable of checking the subscriber ID of the additional application against that of the SIM card before the additional application is started.

When the checking unit 108 determines that the subscriber ID of the additional application and that of the SIM card do not match, a function restricting unit 110 restricts the use of at least a part of the functions of the additional application. For example, given that the additional application is a dialer, the dialer may be allowed to dial an emergency number but is disabled to dial the other numbers.

When the subscriber ID of the additional application already installed in the portable communication terminal and that of the SIM card do not match, the function restricting unit 110 prevents the additional application from being started.

The following modes of "restricting the use of at least a part of the functions of the additional application" are possible.
1. Disabling the operation of the application itself.

This mode encompasses i) preventing the application name from being displayed on a menu screen, thereby preventing the user from accessing the application, ii) deleting the application, iii) preventing the application from being started, and iv) preventing some modules constituting the application from being installed.
2. Transforming the data necessary for the application to achieve its function.

This mode encompasses i) preventing or restricting the access from the application to the data necessary to achieve the function, and ii) substantially disabling the function of the application by rewriting, moving, or deleting the data necessary to achieve the function.
3. Transforming the structure necessary, in an indirect way, for the application to achieve its function.

This mode encompasses preventing the user interface or other programs necessary for the application to achieve its function from being started.

A communication enabling unit 106 enables communication between the application acquiring unit 104 and the server only while the SIM card is accommodated in the SIM card holder 48.

When the SIM card of the portable communication terminal is replaced, an application deleting unit 112 deletes the additional application linked to the SIM card removed. More specifically, when the user replaces the SIM card, the user causes a predetermined screen to be displayed on the portable communication terminal and indicates that the SIM card should be removed. In response, the application deleting unit 112 identifies the application linked to the SIM card and deletes the application from the portable communication terminal. This allows the additional applications that can be used only while the SIM card about to be removed is being installed to be deleted from the portable communication terminal collectively.

It should be noted that the application deleting unit 112 is not an essential component of the embodiment because the additional application need only be disabled for use when another SIM card is installed and need not necessarily be deleted from the portable communication terminal.

When a SIM card is detached from the portable communication terminal, a data saving unit 114 saves the data created by the additional application linked to the SIM card that is detached. This allows the user to use the data created by the additional application later. As described later, the data saving unit 114 saves the data in the SIM card that is detached, the application management server, or a predetermined storage area of the portable communication terminal.

Figure 5:
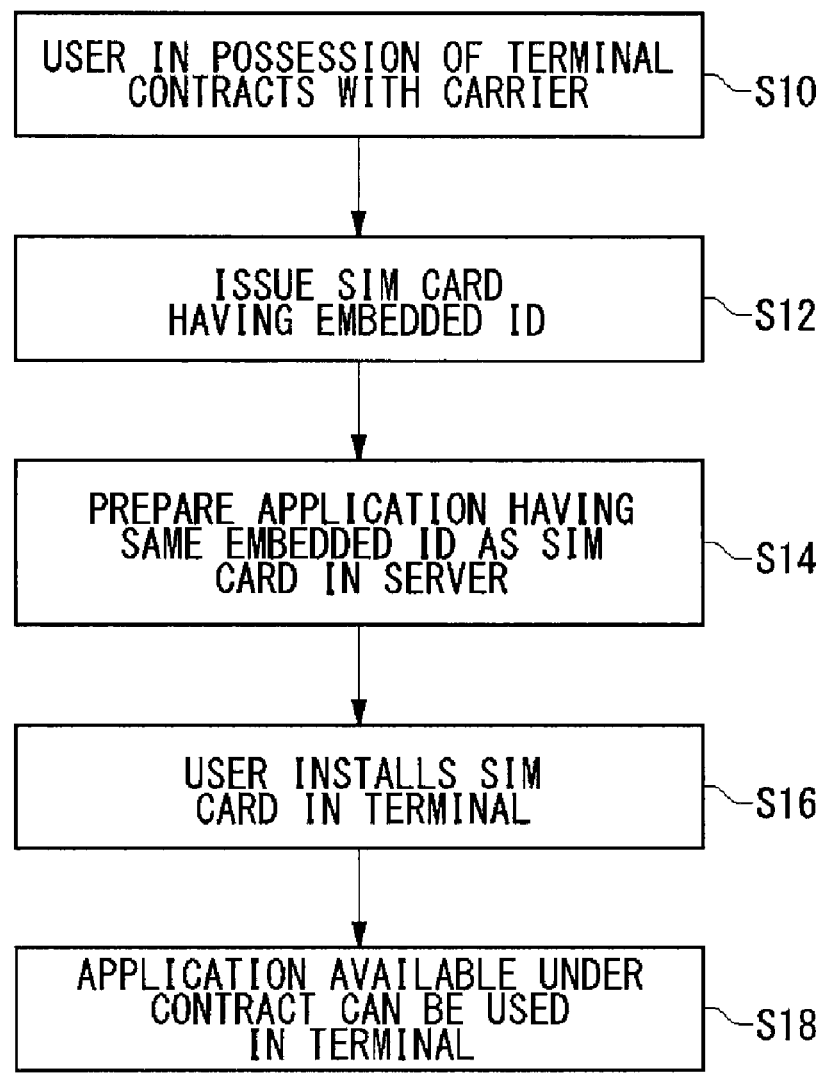
FIG. 5 shows a process according to the embodiment that makes the portable communication terminal available for use by the user.

FIG. 5 shows a process according to the embodiment that makes the portable communication terminal available for use by the user.

The user obtains a portable communication terminal in which the OS and the basic applications as described with reference to FIG. 3 are preinstalled and concludes a contract for phone calls and communication with a carrier (S10). In this process, it is preferable that the user designates an additional application used in the portable communication terminal. When the contract is concluded, a SIM card having a subscriber ID embedded therein is issued from the carrier to the user (S12). In addition to the subscriber ID, the SIM card records information such as the telephone number, information on the carrier, IP address or URL of the application management server, and contract number identifying the application available under contract.

The carrier prepares in the application management server 90 the additional application having the encrypted subscriber ID embedded therein (S14). The carrier also causes the application management server 90 to store the correspondence between the contract number and the additional application. This allows changing, for each SIM card, the type of additional application downloaded from the application management server in accordance with the contract between the user and the carrier.

When the user installs the SIM card in the portable communication terminal (S16) and turns the portable communication terminal on, the additional application is automatically downloaded from the application management server 90. When the subscriber ID of the SIM card is checked against that of the application, the application is made available for use in the portable communication terminal (S18).

Figure 6:
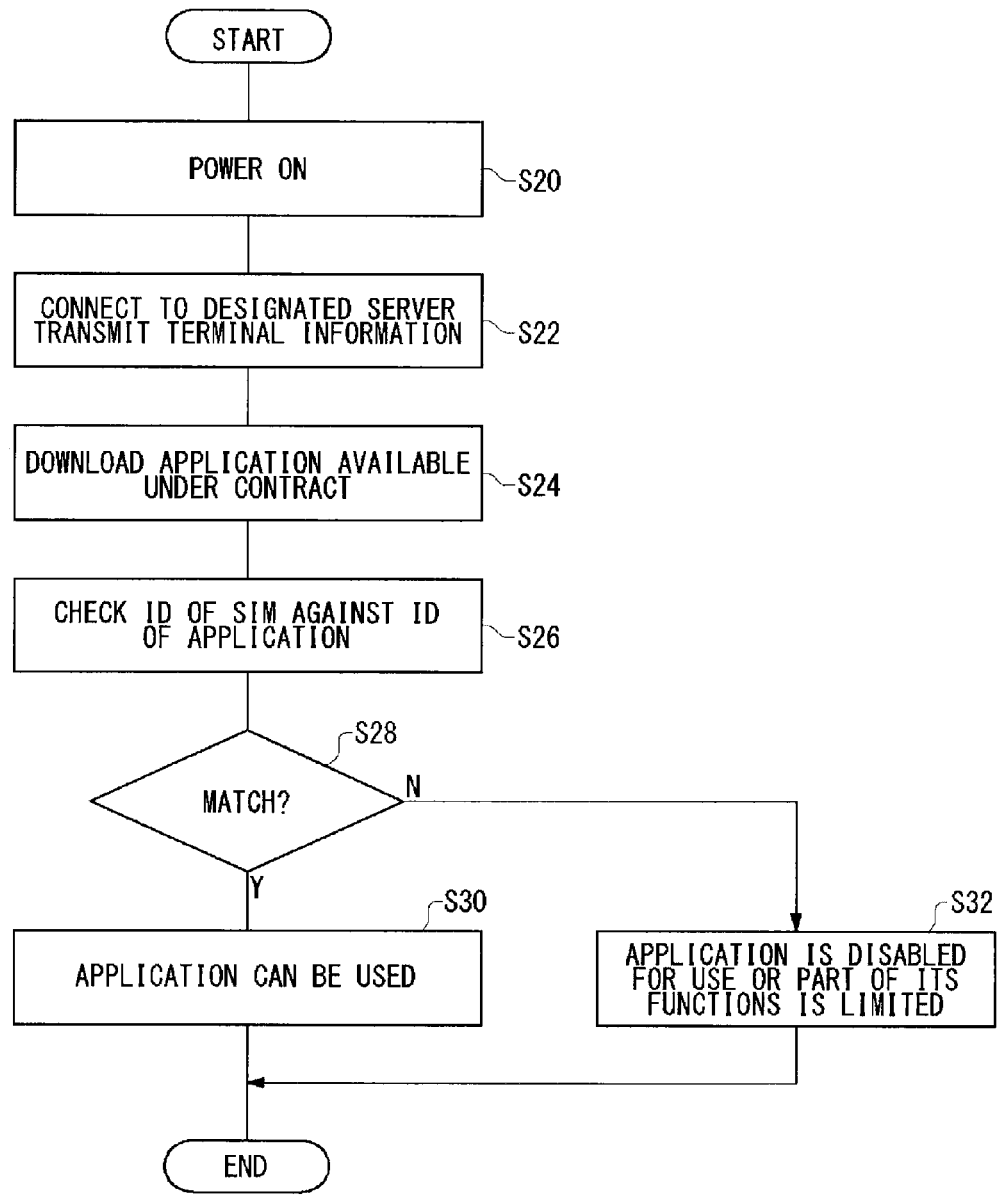
FIG. 6 is a flowchart showing the operation performed in S18 of FIG. 5 at the portable communication terminal.

FIG. 6 is a flowchart showing the operation performed in S18 of FIG. 5 at the portable communication terminal.

When the SIM card is installed in the portable communication terminal and then the terminal is turned on (S20), the application acquiring unit 104 connects to the application management server 90 recorded in the SIM card and transmits the contract number recorded in the SIM card to the server 90 (S22). In this process, the application acquiring unit 104 may transmit the version information or the terminal ID of the portable communication terminal stored in a predetermined storage area of the portable communication terminal to the server 90. Such information may be exploited by the server 90 to select a suitable additional application, if, for example, the type of additional application available for use differs from terminal to terminal.

The application management server 90 receives the contract number and identifies the additional application linked to the contract number and having the subscriber ID embedded therein. The application acquiring unit 104 downloads the additional application thus identified from the server 90 (S24).

The checking unit 108 checks the subscriber ID embedded in the downloaded additional application against the subscriber ID embedded in the SIM card on an application-by-application basis (S26). When they match (Y in S28), the additional application is installed in the portable communication terminal and made available for use (S30). When they do not match (N in S28), the function restricting unit 110 disables the additional application for use and prevents it from being installed. Alternatively, the application is installed such that only a part of the functions can be used (S32).

Figure 7:
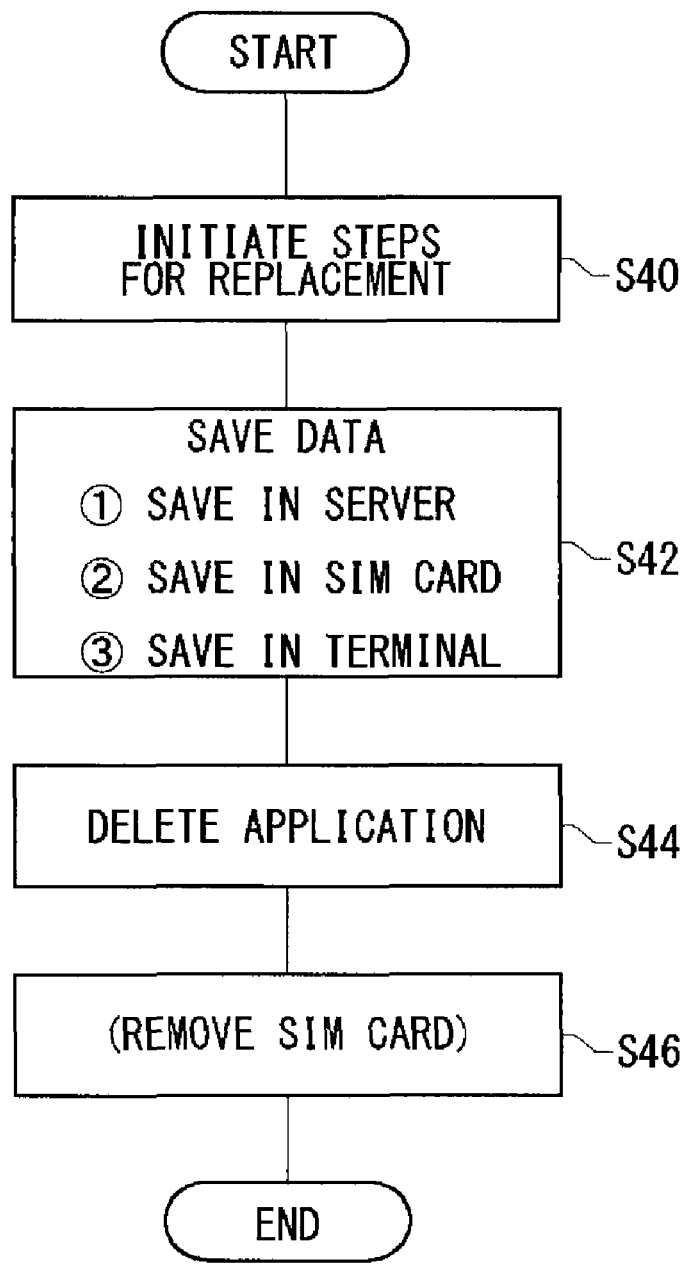
FIG. 7 is a flowchart showing the operation of the portable communication terminal performed when the SIM card attached to the terminal is replaced by another SIM card.

FIG. 7 is a flowchart showing the operation of the portable communication terminal performed when the SIM card attached to the terminal is replaced by another SIM card. Hereinafter, the SIM card that is detached will be referred to as "old SIM card" and the SIM card that is installed will be referred to as "new SIM card".

When the user replaces the SIM card, the user causes an associated screen to be displayed by performing a predetermined operation in the portable communication terminal and indicates that the steps for replacement should be initiated (S40). The data saving unit 114 identifies the additional application linked to the old SIM card by, for example, referring to the subscriber ID. Further, the unit 114 identifies the data created by the additional application thus identified by, for example, referring to an extension. The unit 114 saves the data thus identified in a predetermined location (S42).

The data may be saved in any of the following locations. 1. The data is saved in the old SIM card. In this case, the data created while the old SIM card is being installed cannot be used when the new SIM card is installed. 2. The data is saved in a user-specific area of the application management server. In this case, whether the data saved subsequent to the installation of the new SIM card in the portable communication terminal can be used or not depends on the setting of the server and the portable communication terminal. 3. The data is saved in a predetermined storage area of the portable communication terminal. In this case, the data can be shared whichever of the old and new SIM cards is installed, so long as the carriers use the common data format for the additional applications.

When the data has been saved, the user is given an option of deleting the additional application linked to the old SIM card or not. When the deletion of the additional application is selected, the application deleting unit 112 deletes the additional application linked to the old SIM card from the portable communication terminal (S44). When this process is completed, an indication that the old SIM card can be removed is given to the user, whereupon the user installs the new SIM card (S46). Even when the additional application linked to the old SIM card is not deleted, the additional application linked to the old SIM card will not be used when the new SIM card is installed since the additional application linked to the old SIM card is not started unless the subscriber IDs match.

FIGS. 8A-8D show how additional applications linked to old and new SIM cards are enabled or disabled when the SIM card is replaced.

Figure 8A:
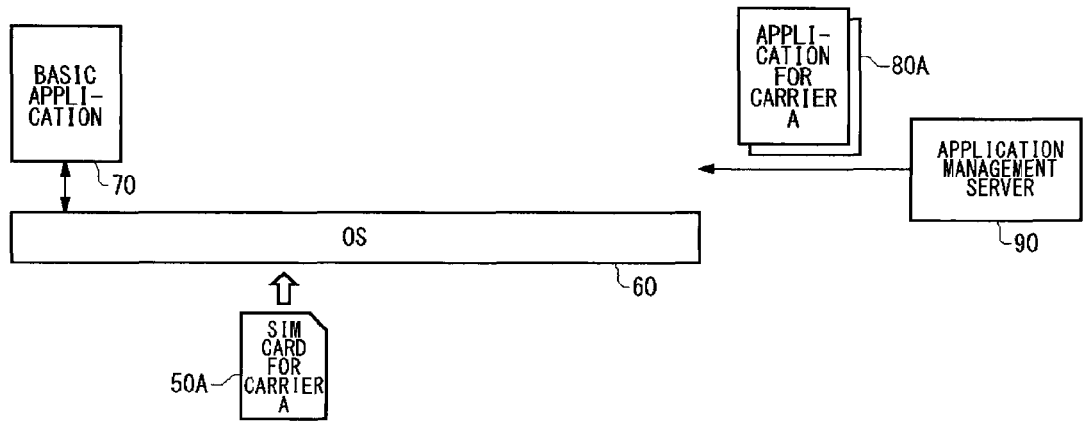
FIGS. 8A-8D show how additional applications linked to old and new SIM cards are enabled or disabled when the SIM card is replaced.

FIG. 8A shows the portable communication terminal where no SIM cards are installed. As mentioned above, only the OS 60 and the basic applications 70 are installed when the SIM card is not installed. When the SIM card 50A available under contract with carrier A is installed, the additional application 80A is downloaded to the portable communication terminal from the application management server 90.

Figure 8B:
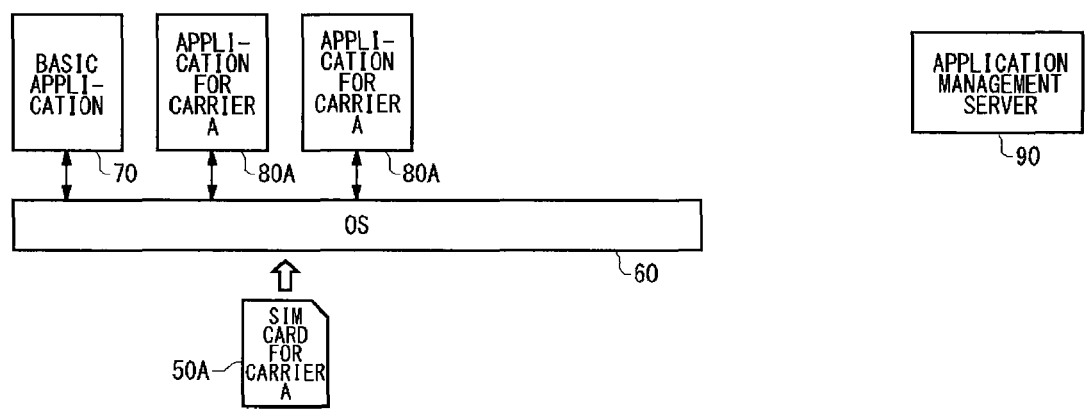

FIG. 8B shows the portable communication terminal where the additional applications 80A thus downloaded are installed. In this state, the additional applications 80A for carrier A are available for use in addition to the basic application 70.

Figure 8C:
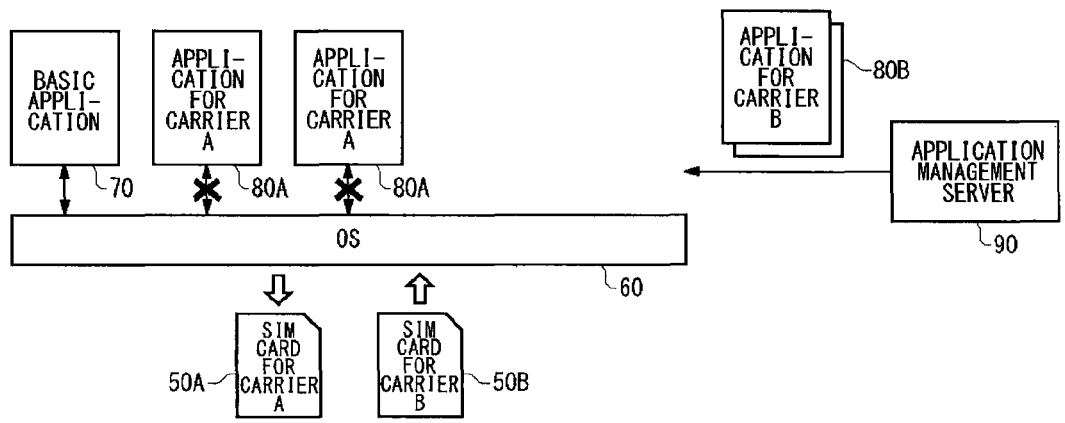

FIG. 8C shows the portable communication terminal where the SIM card 50A for carrier A is detached and the SIM card 50B available under contract with carrier B is installed. By detaching the SIM card 50A for carrier A, the additional applications 80A for carrier A are deleted from the portable communication terminal or disabled for use. Instead, the additional applications 80B for carrier B are downloaded to the portable communication terminal from the application management server 90.

Figure 8D:
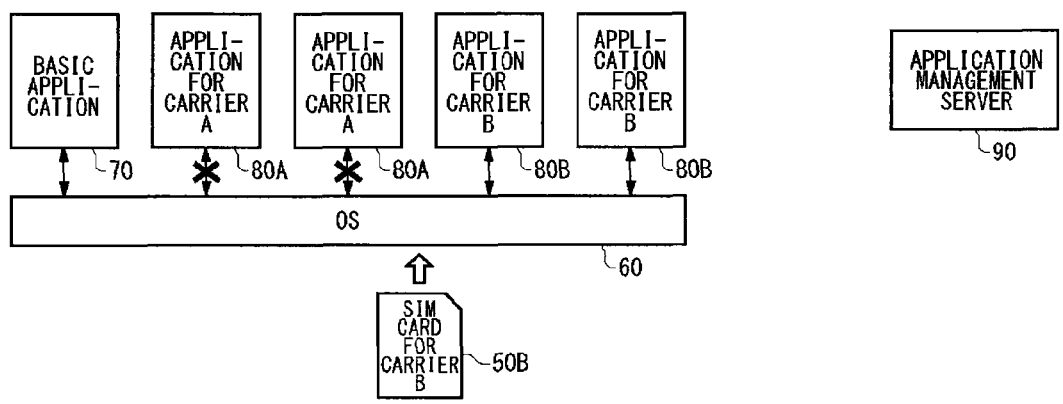

FIG. 8D shows the portable communication terminal where the additional applications 80B thus downloaded are installed. In this state, the additional application 80B for carrier B is available for use in addition to the basic application.

As described above, the portable communication terminal according to the embodiment is provided with the function of downloading the carrier-specific additional application linked to the SIM card from the server of the carrier when the SIM card is installed. Only when the subscriber ID in the SIM card matches the subscriber ID in the additional application, the functions of the additional application are fully made available. In this way, when a SIM card for a different carrier is installed for replacement in a portable communication terminal that can be shared between a plurality of carriers by replacing the SIM card, the additional application specific to the carrier can be immediately switched into use. Further, since the use of the application linked to the previously installed SIM card is restricted when the SIM card for the different carrier is installed, the application specific to the carrier and the services using the same can be protected.

The structure as described above may be taken advantage of by carriers to gain differentiation from competitors by enlarging the variety of additional applications provided by the carrier or providing additional applications with higher performance than those of other carriers. Meanwhile, users are given options to select from a variety of terminals regardless of which carrier the user makes a contract with, by ensuring that the terminals can be commonly used for different carriers.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The portable communication terminal may also be provided with a SIM card history storage unit that records the additional application linked to the SIM card each time the SIM card is installed. The SIM card history storage unit maintains, for example, a table that maps the subscriber ID embedded in the SIM card into the number identifying the additional application.

In the embodiment as described, the user is required to perform predetermined steps before removing the SIM card. However, determination as to the removal of the SIM card may be automatically made using the information in the SIM card history storage unit.

The SIM card is normally accommodated behind the battery pack of the portable communication terminal. Therefore, the power of the portable communication terminal is turned off when the SIM card is removed. When the user installs another SIM card and turns the portable communication terminal on, the SIM card history storage unit checks the subscriber ID of the SIM card last recorded against the subscriber ID of the SIM card installed in the portable information terminal at that point of time. When the IDs do not match, it is determined that the SIM card is replaced.

When it is determined that the SIM card is replaced, the SIM card history storage unit may also determine whether the SIM card currently installed is installed in the portable communication terminal for the first time or not. When the SIM card has the record of being previously installed and the application linked to the SIM card is not deleted and remains in the terminal, the application acquiring unit may not download the additional application from the application management server. Alternatively, the checking unit may omit the step of checking the subscriber ID in the additional application and the ID in the SIM card. In this case, the SIM card history storage unit may identify the additional application linked to the SIM card and present the application to the user as an application available for use with the card.

In the embodiment as described, the user selects whether to delete the additional application linked to the old SIM card about to be removed. Instead, the additional application linked to the old SIM card once removed may be deleted without exception. In this case, the additional application is downloaded anew each time the SIM card is replaced.

When the SIM card history storage unit determines that the SIM card is replaced, the application deleting unit may delete all of the additional applications linked to the old SIM card that remain in the portable communication terminal.

In the embodiment, the checking unit 108 is described as being implemented as a function of the OS. Alternatively, the checking unit 108 may be implemented as a function of the additional application downloaded from the server. In this case, in response to a user instruction for starting an additional application, the associated additional application is started, whereupon the additional application operates as the checking unit 108 to check the subscriber ID of the application against the subscriber ID of the SIM card.

Alternatively, the checking unit 108 may be implemented as a function of the SIM card 50 installed in the portable communication terminal 10. In this case, the CPU in the SIM card operates as the checking unit 108 before the additional application is started and check the subscriber IDs of the additional application and the SIM card.

In the embodiment, the additional application designated by the contract number is described as being downloaded from the application management server 90. Alternatively, other information in the SIM card may be used to designate the additional application. For example, the application may be designated by the subscriber ID or the telephone number.

In the embodiment, it is assumed that a single user switches between SIM cards for different carriers for use. Other modes of use may also be possible. For example, a single portable communication terminal is shared in a family or a place of business, and each one of the family or the employees uses a SIM card specific to the user. The operation in this case is the same as that described above. When the SIM card is replaced, the additional application available with the SIM card under contract is downloaded. This makes it possible for each user to download a desired additional application for a desired carrier and use the portable communication terminal as a terminal exclusive to the user.

The embodiment as described concerns a portable communication terminal in which a SIM card can be installed. However, the present invention can be applied to any recording medium adapted to store identification information specific to the subscriber to the telephone service, and enabling the use of the same telephone number in a plurality of terminals or enabling a single terminal to be shared by a plurality of persons, by replacing the medium attached to the terminal.

The description of the embodiment is primarily directed to the case where the portable communication terminal is a cell phone. Alternatively, the present invention is applicable to a laptop person computer, a personal digital assistant (PDA), a personal handy-phone system (PHS), or the like.

Industrial Applicability

According to the present invention, a portable communication terminal can be used for different carriers and the application or service specific to the carrier can be protected at the same time.

The invention claimed is:

1. A portable communication terminal that functions as a communication instrument by installing an identification recording medium having subscriber information recorded therein, comprising:
    an interface unit operative to communicate with an installed identification recording medium;
    an application acquiring unit operative to connect to a server designated by a first identification recording medium in response to the first identification recording medium being installed for the first time, and to acquire an application program to which a first identification information regarding the first identification recording medium is embedded by the server;

a checking unit operative to check, when a second identification recording medium is installed after the first identification recording medium is removed from the interface unit, the first identification information embedded in the application program that was acquired before the second identification recording medium is installed against a second identification information embedded in the second identification recording medium; and a function restricting unit operative to restrict the use of at least a part of the functions of the application program that was acquired before the second identification recording medium is installed when the first identification information of the application program does not match the second identification information of the second identification recording medium.

2. The portable communication terminal according to claim 1, wherein the application acquiring unit is operative to transmit to the server a third identification information, the third identification information embedded in the first identification recording medium, and terminal information, the terminal information indicating a feature of the portable communication terminal and stored in a predetermined storage area of the portable communication terminal, and to receive the application program linked to the terminal information from the server.

3. The portable communication terminal according to claim 1, wherein when the first identification information of the application program already installed in the portable communication terminal and the second identification information of the second identification recording medium do not match, the function restricting unit is operative to prevent the application program from being started.

4. The portable communication terminal according to claim 1, further comprising:

a communication enabling unit operative to enable communication with the server while the first identification recording medium or the second identification recording medium is installed.

5. The portable communication terminal according to claim 1, wherein the checking unit is implemented as a function of the operating system of the portable communication terminal and is operative to check the first identification information of the application program against the second identification information of the second identification recording medium before the application program is started.

6. The portable communication terminal according to claim 1, wherein the checking unit is implemented as a function of the application program installed in the portable communication terminal and is operative to check the first identification information of the application program against the second identification information of the second identification recording medium after the application program is started.

7. The portable communication terminal according to claim 1, wherein the checking unit is implemented as a function of the second identification recording medium installed in the portable communication terminal and is operative to check the first identification information of the application program against the second identification information of the second identification recording medium before the application program is started.

8. The portable communication terminal according to claim 1, further comprising:

an application deleting unit operative to delete the application program linked to the first identification recording medium when the first identification recording medium is detached from the portable communication terminal.

9. The portable communication terminal according to claim 1, further comprising:

a data saving unit operative to save data created by the application program linked to the first identification recording medium that is detached from the portable communication terminal.

10. The portable communication terminal according to claim 9, wherein the data saving unit is operative to save the data in the first identification recording medium.

11. The portable communication terminal according to claim 9, wherein the data saving unit is operative to save the data in the server.

12. The portable communication terminal according to claim 9, wherein the data saving unit is operative to save the data in a storage area of the portable communication terminal.

13. A non-transitory computer-readable storage medium having computer readable instructions for executing on a portable communication terminal that functions as a communication instrument by installing an identification recording medium having subscriber information recorded therein, the instructions comprising:

connecting the portable communication terminal to a server designated by a first identification recording medium in response to the first identification recording medium being installed in the portable communication terminal for the first time;

downloading to the terminal an application program to which a first identification information regarding the first identification recording medium is embedded by the server;

checking, when a second identification recording medium is installed after the first identification recording medium is removed from the portable communication terminal, the first identification information embedded in the application program that was acquired before the second identification recording medium is installed against a second identification information embedded in the second identification recording medium; and restricting the use of at least a part of the functions of the application program that was acquired before the second identification recording medium is installed when the first identification information of the application program does not match the second identification information of the second identification recording medium.

14. The non-transitory computer-readable storage medium according to claim 13, the instructions further comprising:

transmitting to the server a third identification information, the third identification information embedded in the first identification recording medium, and terminal information, the terminal information indicating a feature of the portable communication terminal and stored in a predetermined storage area of the portable communication terminal, and receiving the application program linked to the terminal information from the server.

15. The non-transitory computer-readable storage medium according to claim 13, wherein
when the first identification information of the application program already installed in the portable communication terminal and the second identification information of the second identification recording medium do not match, the instructions restricting the use of at least a part of the functions of the application program further includes instructions preventing the application program from being started.

16. The non-transitory computer-readable storage medium according to claim 13, the instructions further comprising:
communicating with the server only while the first identification recording medium or the second identification recording medium is installed.

17. The non-transitory computer-readable storage medium according to claim 13, wherein
the instructions for checking identification information are implemented as a function of the operating system of the portable communication terminal and checks the first identification information of the application program against the second identification information of the second identification recording medium before the application program is started.

18. The non-transitory computer-readable storage medium according to claim 13, wherein
the instructions for checking identification information are implemented as a function of the application program installed in the portable communication terminal and checks the first identification information of the application program against the second identification information of the second identification recording medium after the application program is started.

19. The non-transitory computer-readable storage medium according to claim 13, wherein
the instructions for checking identification information are implemented as a function of the second identification recording medium installed in the portable communication terminal and checks the first identification information of the application program against the second identification information of the second identification recording medium before the application program is started.

20. The non-transitory computer-readable storage medium according to claim 13, the instructions further comprising:
deleting the application program linked to the first identification recording medium when the first identification recording medium is detached from the portable communication terminal.

21. The non-transitory computer-readable storage medium according to claim 13, the instructions further comprising:
saving data created by the application program linked to the first identification recording medium that is detached from the portable communication terminal.

22. The non-transitory computer-readable storage medium according to claim 21, wherein
the instructions for saving data saves the data in the first identification recording medium.

23. The non-transitory computer-readable storage medium according to claim 21, wherein
the instructions for saving data saves the data in the server.

24. The non-transitory computer-readable storage medium according to claim 21, wherein
the instructions for saving data saves the data in a storage area of the portable communication terminal.

* * * * *